July 1, 1930.  D. E. SMITH  1,769,396
CLEAN EGG NEST STRUCTURE
Filed Oct. 29, 1928
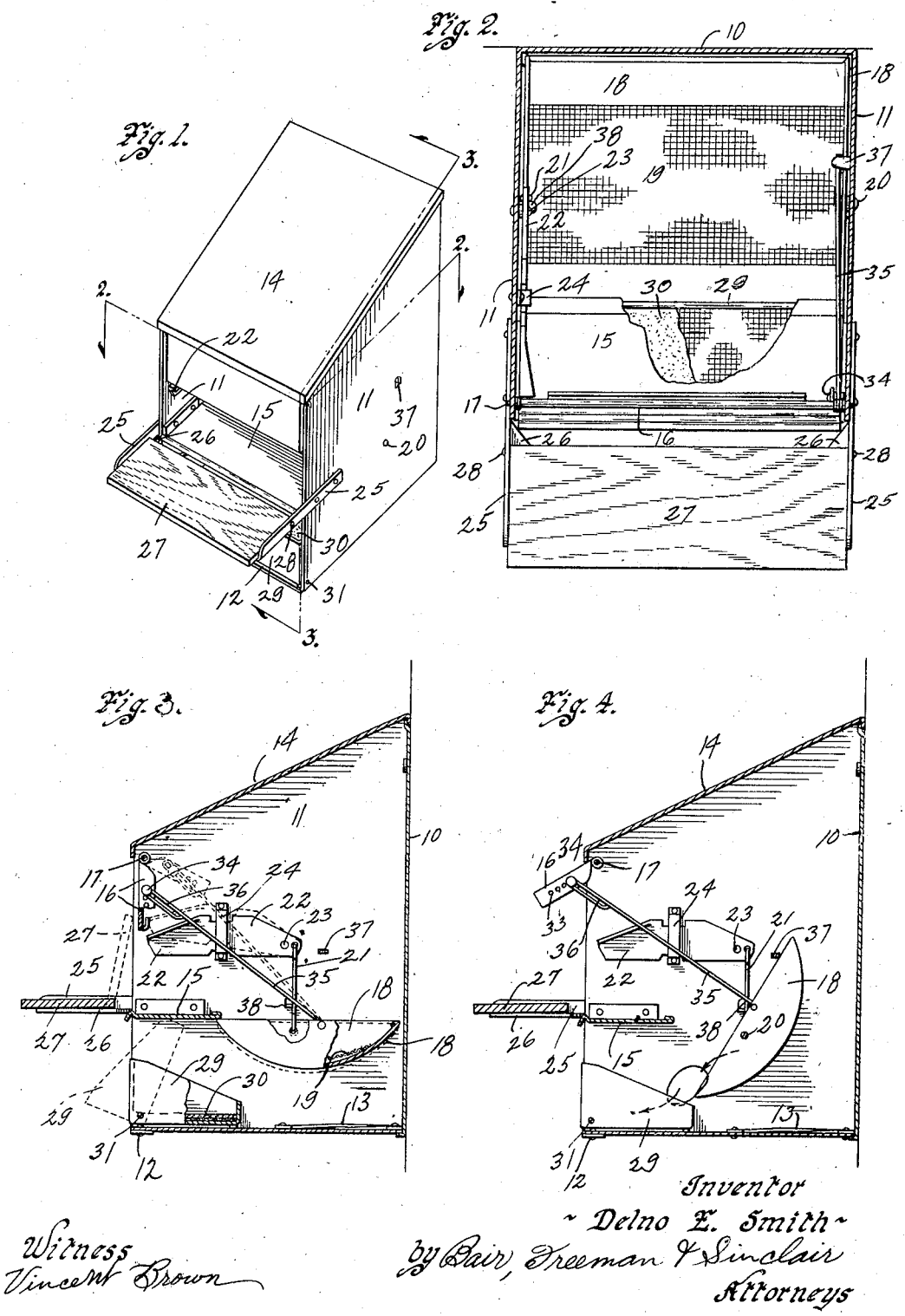
Witness
Vincent Brown
Inventor
Delno E. Smith
by Bair, Freeman & Sinclair
Attorneys Patented July 1, 1930

1,769,396

UNITED STATES PATENT OFFICE

DELNO E. SMITH, OF INDIANOLA, IOWA

CLEAN-EGG NEST STRUCTURE

Application filed October 29, 1928. Serial No. 315,678.

The object of this invention is to provide an improved construction for a nesting device particularly adapted for the use of laying hens or other fowls.

A further object of the invention is to provide an improved nest structure so arranged that seclusion for the occupant of the nest is assured.

Still another object is to provide an improved nest structure in which means is provided for automatically depositing an egg contained in the nest into a separate tray as the hen leaves the nest.

A further object is to provide an improved nest structure having a door pivoted on a horizontal axis and having pivotal connections to a pivoted nest device so arranged as to tilt the nest when the door is moved in one direction for the purpose of depositing an egg or eggs which may be contained in the nest, thereby leaving the nest empty for a succeeding occupant and insuring that eggs laid in the nest will not be soiled nor broken by succeeding occupants.

A further object of the invention is to provide an improved nest structure having a pivoted entrance perch which may be moved to a position for closing the entrance to the nest housing.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of an improved nest structure embodying my invention.

Figure 2 is a horizontal section on the line 2—2 of Figure 1 on an enlarged scale.

Figure 3 is a vertical section on the line 3—3 of Figure 1, the dotted lines indicating positions to which some of the parts are movable.

Figure 4 is a vertical section through the device showing the parts in position for depositing the contents of the nest onto the egg tray.

The nest structure includes a housing having a rear wall 10 and spaced side walls 11, the bottom edges of the side walls 11 being connected by suitable braces such as 12 and 13.

A movable cover member 14 is provided for the housing, which may be a flanged sheet of metal engaging the top margins of the rear and side walls as shown.

A step member or threshold 15 is rigidly mounted transversely of the forward portion of the housing at a considerable distance above the bottom thereof and the space between said step member and the forward margin of the cover member 14 constitutes an entrance and exit passage for the housing.

A swinging door 16 is mounted across the upper portion of the entrance to the housing and is pivoted at its upper margin to the housing side walls 11 at the point 17.

A nest device is pivotally mounted within the housing and comprises a pan or the like 18 which may be supplied with suitable nesting material and preferably includes a reticulated sheet 19 over the major portion of its bottom.

At one end, the nest device 18 is pivoted directly to a wall 11 of the housing at the point 20 which is located somewhat forwardly of the center of gravity of the nest.

The other end portion of the nest 18 is suspended by a link 21 from the short arm of a lever 22 which is pivoted at 23 to the other side wall 11 of the housing. The lever 22 is normally arranged in substantially horizontal position and its forward portion is confined for limited movement in a keeper 24 fixed to the housing wall.

This method of pivotally mounting the nest 18 permits of a limited downward movement when weight is placed thereon, as by the entrance of a hen to the nest and such downward movement causes a raising of the forward end of the lever 22 to the position shown by dotted lines in Figure 3. When the forward end of the lever 22 is raised it engages behind the swinging door 16 and prevents inward pivotal movement of the door, thereby preventing the entrance of other fowls to the nest housing so long as the nest is occupied.

Perch bars 25 are fixed to and extend forwardly of the side walls 11 of the housing at about the level of the step member 15 and said perch bars are formed with inturned flanges 26 upon which a perch 27 is mounted. The perch 27 preferably has its rear marginal portion pivoted to the perch bars 25 at the point 28 so that said perch may be folded upwardly at times, as indicated by dotted lines in Figure 3, over the lower portion of the entrance way to the housing.

An egg tray 29 is movably mounted in the lower forward portion of the nest housing and is adapted to receive eggs from the nest 18. The tray 29 may be provided with cushioning material 30 covering its bottom.

The egg tray 29 may be mounted in any suitable manner, but I prefer to provide pivots 31 at the lower forward portion of the tray and engaging the side walls 11. This permits the tray to be tipped forwardly, as indicated by dotted lines in Figure 3, for removing eggs therefrom and at the same time insures that the tray will normally be in position to receive eggs from the nest, as hereinafter set forth.

The swinging door 16 is provided at one edge with a rearwardly directed flange 32 formed with a plurality of holes 33 in which a bolt 34 may be selectively mounted.

A link 35 is pivoted at one end to the nest device 18 at a point rearwardly of the pivot 20 and said link is formed at its opposite end with an elongated eye or loop 36 engaging the bolt 34.

When a fowl is ready to leave the nest she steps from the nest device 18 upon the step 15 and then pushes against the swinging door 16, causing it to swing outwardly, as shown in Figure 4, as she passes from the housing to the perch 27.

The forward swinging of the door 16 causes a forward tipping of the nest device 18, which serves to deposit the contents of the nest into the egg tray 29.

As soon as the body of the fowl clears the housing the door 16 and nest device assume their normal positions, as shown by full lines in Figure 3, and the device is ready for the entrance of another fowl.

The elongated eye 36 of the tripping link 35 permits inward swinging of the door 16, as indicated by dotted lines in Figure 3.

The pivoting of the perch 27 facilitates access to the egg tray 29 and also provides a means for closing the housing temporarily to prevent the entrance of fowls thereto.

It is obvious that by my improved arrangement I have provided a nest for laying hens which insures seclusion and thus results in better conditions and increased egg production.

It will be noted that the nest device 18 or pan has a curved formation of its bottom member or in other words, is formed on the segment of a cylinder. This provides a convenient shape for the nest and also permits an egg which may be contained therein to roll from the forward edge of the pan when it is tilted through outward swinging of the door as the fowl leaves the housing.

By this method of removing a newly laid egg from the nest device before another fowl can enter the housing, I have provided means for keeping the eggs clean and also for insuring that they will not be broken by other fowls.

A stop 37 is mounted on one or both side walls 11 of the housing for engagement by the rear portion of the nest pan 18 to limit the tipping movement.

The provision of a plurality of bolt holes 33 in the flange 32 of the swinging door permits an adjustment for hens of different size by regulating the distance to which the door may move in its outward swinging movement.

The suspension of the nest device 18 at one end by means of the loop 21 from the short arm of the lever 22 permits a slight downward movement of the nest when a hen enters the same for the purpose of latching the door against inward swinging movement and the keeper 24 limits the upward movement of the forward portion of the lever and consequently the downward movement of the nest.

This device is comparatively simple and inexpensive to manufacture, as the parts may in the main, be made from sheet metal and they are easily assembled and not likely to get out of order.

Owing to the method of pivotally suspending the nest device 18 there is some backward and forward swinging movement thereof, which movement is limited in one direction by the rear wall 10 of the housing and in the other direction by a stop 38 on the side wall 11 engageable by the link 21.

The forward portion of the nest device 18 projects beneath the step 15 to restrict rearward tilting of the nest device.

I claim:

1. A nest structure of the character described comprising a housing having an entrance opening at one side, a door pivotally mounted in said opening and capable of inward and outward swinging movement, a threshold member extending inwardly from said entrance opening upon which a fowl must step in entering or leaving the housing, a nest device pivotally mounted in said housing, an egg receptacle in said housing, and having a part at its forward end engaging beneath said threshold member, and a pivotal connection between said door and the nest device whereby outward swinging of the door as a fowl leaves the housing will cause a tilting of the nest device to deposit its contents in said receptacle.

2. A nest structure of the character described comprising a housing having an entrance opening at one side, a door pivotally mounted in said opening and capable of inward and outward swinging movement, a nest device pivotally mounted in said housing, a latching lever, a pivotal connection between said latching lever and the nest device whereby the application of weight to the latter will move said latching lever to a position for preventing inward swinging movement of said door, an egg receptacle in said housing, and a pivotal connection between said door and the nest device whereby outward swinging of the door will cause a tilting of the nest device to deposit its contents in said receptacle.

3. A nest structure of the character described comprising a housing having an entrance opening at one side, a door pivotally mounted in said opening and capable of inward and outward swinging movement, a nest device pivotally mounted in said housing, an egg receptacle in said housing, and a sliding pivotal connection between said door and the nest device whereby outward swinging of the door will cause a tilting of the nest device to deposit its contents in said receptacle, the pivots of said nest device being located forwardly of its center of gravity whereby said nest device is normally tilted rearwardly and serves to hold said door in closed position, said sliding pivotal connection permitting inward swinging of the door without tilting said nest device.

4. A nest structure of the character described comprising a housing having an entrance opening at one side, a door pivotally mounted in said opening and capable of inward and outward swinging movement, a nest device pivotally mounted in said housing, a latching member, a pivotal connection between said latching member and the nest device whereby the application of weight to the latter will move said latching member to a position for preventing inward swinging movement of said door, an egg receptacle in said housing, and a pivotal connection between said door and the nest device whereby outward swinging of the door will cause a tilting of the nest device to deposit its contents in said receptacle, together with means for limiting tilting and downward movement of said nest device.

5. A nest structure of the character described comprising a housing having an entrance opening at one side, a door pivotally mounted in said opening and capable of inward and outward swinging movement, a nest device pivotally mounted in said housing, a latching lever pivoted in said housing, a link pivoted to said lever and to the nest device and permitting a limited downward movement of the latter, such downward movement causing an oscillation of said lever to a position for preventing inward swinging movement of said door, an egg receptacle in said housing, and a pivotal connection between said door and the nest device whereby outward swinging of the door will cause a tilting of the nest device to deposit its contents in said receptacle.

6. A nest structure of the character described comprising a housing having an entrance opening at one side, a door pivotally mounted in said opening and capable of inward and outward swinging movement, a nest device pivotally mounted in said housing, a latching lever pivoted in said housing, a link pivoted to said lever and to the nest device and permitting a limited downward movement of the latter, such downward movement causing an oscillation of said lever to a position for preventing inward swinging movement of said door, a keeper for confining said lever and limiting its movement to hold said nest device normally in substantially horizontal position, an egg receptacle in said housing, and a pivotal connection between said door and the nest device whereby outward swinging of the door will cause a tilting of the nest device to deposit its contents in said receptacle.

7. A nest structure of the character described comprising a housing having an entrance opening at one side, a door pivotally mounted in said opening and capable of inward and outward swinging movement, a nest device in said housing, said nest device being provided at one end only with a direct pivotal connection to a wall of the housing, a lever pivoted on the opposite wall of the housing, a link forming a pivotal connection between said lever and the nest device, a keeper embracing said lever and permitting only a slight oscillation thereof, whereby said nest device is held against any material amount of forward tilting because of weight imposed thereon, an egg receptacle in said housing, and a pivotal connection between said door and the nest device whereby outward swinging of the door will cause a sufficient forward tilting of the nest device to deposit its contents in said receptacle.

Des Moines, Iowa, October 16, 1928.

DELNO E. SMITH.